US010927778B2

(12) United States Patent
Nagao et al.

(10) Patent No.: US 10,927,778 B2
(45) Date of Patent: Feb. 23, 2021

(54) ENGINE SYSTEM

(71) Applicant: AISAN KOGYO KABUSHIKI KAISHA, Obu (JP)

(72) Inventors: Masateru Nagao, Ichinomiya (JP); Mamoru Yoshioka, Nagoya (JP); Masanao Kurita, Toyoake (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 0 days.

(21) Appl. No.: 16/374,878

(22) Filed: Apr. 4, 2019

(65) Prior Publication Data

US 2019/0338717 A1 Nov. 7, 2019

(30) Foreign Application Priority Data

Mar. 13, 2018 (JP) .............................. JP2018-046015

(51) Int. Cl.
*F02D 41/00* (2006.01)
*F02D 41/14* (2006.01)

(52) U.S. Cl.
CPC ....... *F02D 41/0077* (2013.01); *F02D 41/005* (2013.01); *F02D 41/1495* (2013.01)

(58) Field of Classification Search
CPC .... F02M 26/49; F02M 26/50; F02M 35/1038; F02M 35/10386; F02M 26/48; F02M 26/68; F02M 26/66; F02M 26/54; F02M 26/19; F02M 26/22; F02D 41/0077; F02D 41/1495; F02D 41/005; F02D 41/0055;
(Continued)

(56) References Cited

U.S. PATENT DOCUMENTS 5,675,080 A * 10/1997 Wada ..................... F02M 26/49
73/114.74
2006/0272625 A1* 12/2006 Wang ..................... F02M 26/47
123/568.16
(Continued)

FOREIGN PATENT DOCUMENTS

JP H04-234552 A 8/1992
JP H08-035449 A 2/1996
(Continued)

OTHER PUBLICATIONS

Nov. 20, 2018 Office Action issued in Japanese Patent Application No. 2018-046015.

*Primary Examiner* — Phutthiwat Wongwian
*Assistant Examiner* — Sherman D Manley
(74) *Attorney, Agent, or Firm* — Oliff PLC

(57) ABSTRACT

An engine system includes an injector, an EGR device (including an EGR valve having a step motor) to recirculate part of exhaust gas of an engine as EGR gas to the engine, and an electronic control unit (ECU) to control the injector, the EGR valve, and others based on an operating state of the engine. The ECU is configured to diagnose foreign-matter lodging abnormality of the EGR valve and a lodged foreign-matter diameter based on detected intake pressure during engine deceleration. When existence of the abnormality and the foreign-matter diameter are determined, the ECU controls the step motor to hold the EGR valve at a first opening degree smaller than a second opening degree needed to remove a foreign matter before fuel cut to the engine by the injector.

6 Claims, 11 Drawing Sheets

(58) Field of Classification Search
CPC . F02D 41/123; F02D 2200/0406; Y02T 10/40
See application file for complete search history.

(56) References Cited

U.S. PATENT DOCUMENTS

| | | | |
|---|---|---|---|
| 2013/0312719 A1* | 11/2013 | Mikashima | F02D 41/0055 123/568.21 |
| 2013/0319383 A1* | 12/2013 | Yoshioka | F02D 41/123 123/568.21 |
| 2018/0106220 A1* | 4/2018 | Yoshioka | F16K 1/2021 |

FOREIGN PATENT DOCUMENTS

| | | |
|---|---|---|
| JP | H08-334064 A | 12/1996 |
| JP | H09-317570 A | 12/1997 |
| JP | 2010-106785 A | 5/2010 |
| JP | 2012-007561 A | 1/2012 |
| JP | 2013-249774 A | 12/2013 |
| JP | 2016-176420 A | 10/2016 |
| JP | 2017-206996 A | 11/2017 |

* cited by examiner

AA: BEHAVIOR DUE TO FOREIGN MATTER
BB: STEP-OUT (CONVENTIONAL ART)
CC: BEHAVIOR DUE TO STEP-OUT
DD: RELEASED FROM STEP-OUT (PRESENT EMBODIMENT)
EE: INITIALIZATION
FF: CONTROL IN CONVENTIONAL ART (STEP-OUT)
GG: CONTROL IN PRESENT INVENTION
    (STEP-OUT ⇒RESTORATION)
HH: FOREIGN MATTER LODGING

ENGINE SYSTEM

CROSS-REFERENCE TO RELATED APPLICATIONS

This application is based upon and claims the benefit of priority from the prior Japanese Patent Applications No. 2018-046015 filed on Mar. 13, 2018, the entire contents of which are incorporated herein by reference.

BACKGROUND

Technical Field

The present disclosure relates to an engine system provided with an exhaust gas recirculation device (including an exhaust gas recirculation valve) to allow part of exhaust gas of an engine to recirculate as an exhaust recirculation gas into the engine, and configured to control the exhaust gas recirculation valve according to an operating state of the engine.

Related Art

As the above type of technique, heretofore, there has been known for example a technique disclosed in Japanese unexamined patent application publication No. 2016-176420 (JP 2016-176420A), titled "Control device of internal combustion engine". This art includes an EGR device including: an EGR passage connecting an intake passage and an exhaust passage of the engine; and an EGR valve placed in the EGR passage, and an electronic control unit (ECU) for controlling the EGR valve. The EGR valve is configured such that a valve element is opened and closed by a step motor. The ECU is configured to output (command) a pulse signal representative of the number of steps complying with a required target opening degree in order to control the opening degree of the valve element of the EGR valve.

Herein, if the step motor of the EGR valve falls out of step, the valve element will not behave to follow the pulse signal (the number of steps) given to the step motor. In the EGR valve, therefore, a divergence occurs between the target opening degree according to the number of steps instructed by the ECU and an actual opening degree. On the other hand, when the ECU controls the EGR valve to be fully closed, a similar divergence occurs when a foreign matter is lodged or caught between the valve element and a valve seat. If the actual opening degree deviates from the target opening degree as above, some errors may be caused in the flow rate of EGR gas regulated by the EGR valve, leading to the difficulty in accurately performing EGR control.

The art in JP 2016-176420A therefore compares an intake pressure which is predicted based on a current opening degree of the EGR valve recognized by the ECU (an EGR opening degree), an opening degree of a throttle valve (a throttle opening degree), and the number of engine rotations, with an actual intake pressure detected by an intake pressure sensor. When a difference therebetween is equal to or larger than a predetermined threshold, the ECU is configured to give the EGR valve a signal to enlarge once the opening degree of the EGR valve during fuel cut operation of the engine in order to remove a foreign matter lodged in the EGR valve (Foreign-matter removal control), and successively give the EGR valve a signal to greatly decrease the opening degree relative to the current EGR opening degree recognized by the ECU (Initialization). In the EGR valve, accordingly, the divergence between the target opening degree and the actual opening degree can be appropriately eliminated regardless whether it is caused by step-out or foreign-matter lodging.

FIG. 11 is a time chart showing a relationship between the intake pressure of an engine and the number of steps (a command value) outputted from the ECU to the step motor of the EGR valve. in FIG. 11, (a) indicates the intake pressure and (b) shows the number of steps. In FIG. 11 (a), a solid line pm1 represents a normal case in which the step motor is not out of step, a solid line pm2 shows a case in which the step motor is out of step but is released from step-out in midstream, i.e., in the middle of the time-lapse, a solid line pm3 indicates a case in which a foreign matter becomes lodged in the EGR valve in midstream, and a thick broken line pm4 shows a case in which the step motor is out of step but is not released from step-out in midstream. In FIG. 11 (b), a thick line s1 represents a case in which the step motor is not out of step, a thick line s2 shows a case in which the step motor is out of step but is released from step-out in midstream, a thick broken line s3 indicates a case in which the step motor is not out of step and a foreign matter is lodged therein in midstream, a thick broken line s4 shows a case in which the step motor is not out of step and no initialization is performed in midstream, and a thick broken line s5 indicates a case in which the step motor is out of step but is not released from step-out in midstream. In FIG. 11 (b), when the EGR valve is closed toward a fully closed state from time t1, in the case where the step motor is out of step, the EGR valve that should be fully closed (the number of steps=0) at time t5 (a thick line s1) delays in fully closing to time t6 (the thick line s2). In FIG. 11 (a), therefore, as indicated by the solid line pm1 and the solid line pm2, when the step motor is out of step, a change (a difference) appears in the intake pressure between when the step motor is out of step and when the step motor is not out of step at a relatively initial stage of deceleration start (e.g., at time t2). From this change (difference), step-out of the step motor can be determined. When a foreign matter is lodged, on the other hand, as indicated by the solid line pm3, the intake pressure does not sufficiently decrease as compared with the solid line pm1 even at the stage that the number of steps becomes small (e.g., at time t4), foreign matter abnormality can be determined. Further, at the time of determination of step-out, as shown in FIG. 11 (b), the rotor of the step motor is rotated to a mechanical original position, thereby enabling to initialize and thus restore the step motor from step-out.

SUMMARY

Technical Problem

In the art disclosed in JP 2016-176420A, however, the signal to enlarge once the opening degree of the EGR valve is given to the EGR valve to execute the foreign-matter removal control (the control to resolve the abnormality in the EGR valve) during fuel cut operation of the engine. During deceleration of the engine, therefore, enlarging the opening degree of the EGR valve is performed after waiting until the fuel cut starts. This takes long to complete enlarging of the opening degree of the EGR valve. In the meantime, therefore, the EGR gas may be caused to leak from the EGR valve and flow in the engine, leading to combustion deterioration in the engine.

In the art of JP 2016-176420A, furthermore, when the step motor of the EGR valve is out of step to an open side (a side in which the opening degree is larger than a target opening degree), if the opening degree is enlarged for removal of foreign matter, the valve element is likely to open more widely than required, which may cause EGR gas to flow in the engine excessively. On the other hand, when the step motor is out of step to a closed side (a side in which the opening degree is smaller than the target opening degree), even if the opening degree is enlarged for removal of foreign matter, the valve element may not reach a necessary opening degree or may take a long time to reach. Moreover, when the valve element is steeply closed from the enlarged opening degree after removal of foreign matter, an engine combustion state is rapidly improved, thereby sharply increasing torque, resulting in deterioration in drivability.

The present disclosure has been made to address the above problems and has a purpose to provide an engine system capable of shortening the time needed to open an exhaust gas recirculation valve to a necessary opening degree at the timing of resolving abnormality in the exhaust gas recirculation valve to enhance operational performance of resolving the abnormality.

Means of Solving the Problem

To achieve the above purpose, one aspect of the present disclosure provides an engine system comprising: an engine; an intake passage configured to introduce intake air into the engine; an exhaust passage configured to discharge exhaust gas from the engine; a fuel supply unit configured to supply fuel to the engine; an exhaust gas recirculation device including: an exhaust gas recirculation passage configured to allow part of the exhaust gas discharged from the engine to the exhaust passage to flow as an exhaust recirculation gas into the intake passage to recirculate into the engine; and an exhaust gas recirculation valve configured to regulate an amount of the exhaust recirculation gas in the exhaust gas recirculation passage, the exhaust gas recirculation valve including a valve seat, a valve element provided to be capable of seating on the valve seat, and a step motor configured to drive the valve element; an operating-state detecting unit configured to detect an operating state of the engine; and a controller configured to control at least the fuel supply unit and the step motor of the exhaust gas recirculation valve based on the detected operating state of the engine, wherein the controller is configured to diagnose abnormality in opening/closing between the valve seat and the valve element in the exhaust gas recirculation valve and a level of the abnormality based on the detected operating state during deceleration of the engine, and when existence of the abnormality and the abnormality level are determined, and before supply of the fuel to the engine by the fuel supply unit is shut off, the controller is configured to control the step motor to hold the exhaust gas recirculation valve at a first opening degree smaller by a predetermined value than a second opening degree needed to resolve the determined abnormality and larger than a minimum controlled opening degree after deceleration start of the engine but before the existence of the abnormality is determined.

The foregoing configuration can shorten the time needed to open an exhaust gas recirculation valve to a necessary second opening degree at the timing of resolving abnormality in the exhaust gas recirculation valve to enhance operational performance of resolving the abnormality.

DETAILED DESCRIPTION OF THE EXEMPLARY EMBODIMENTS

A detailed description of an embodiment of an engine system of this disclosure embodied into a gasoline engine system will now be given referring to the accompanying drawings.

(Outline of Engine System)

Figure 1:
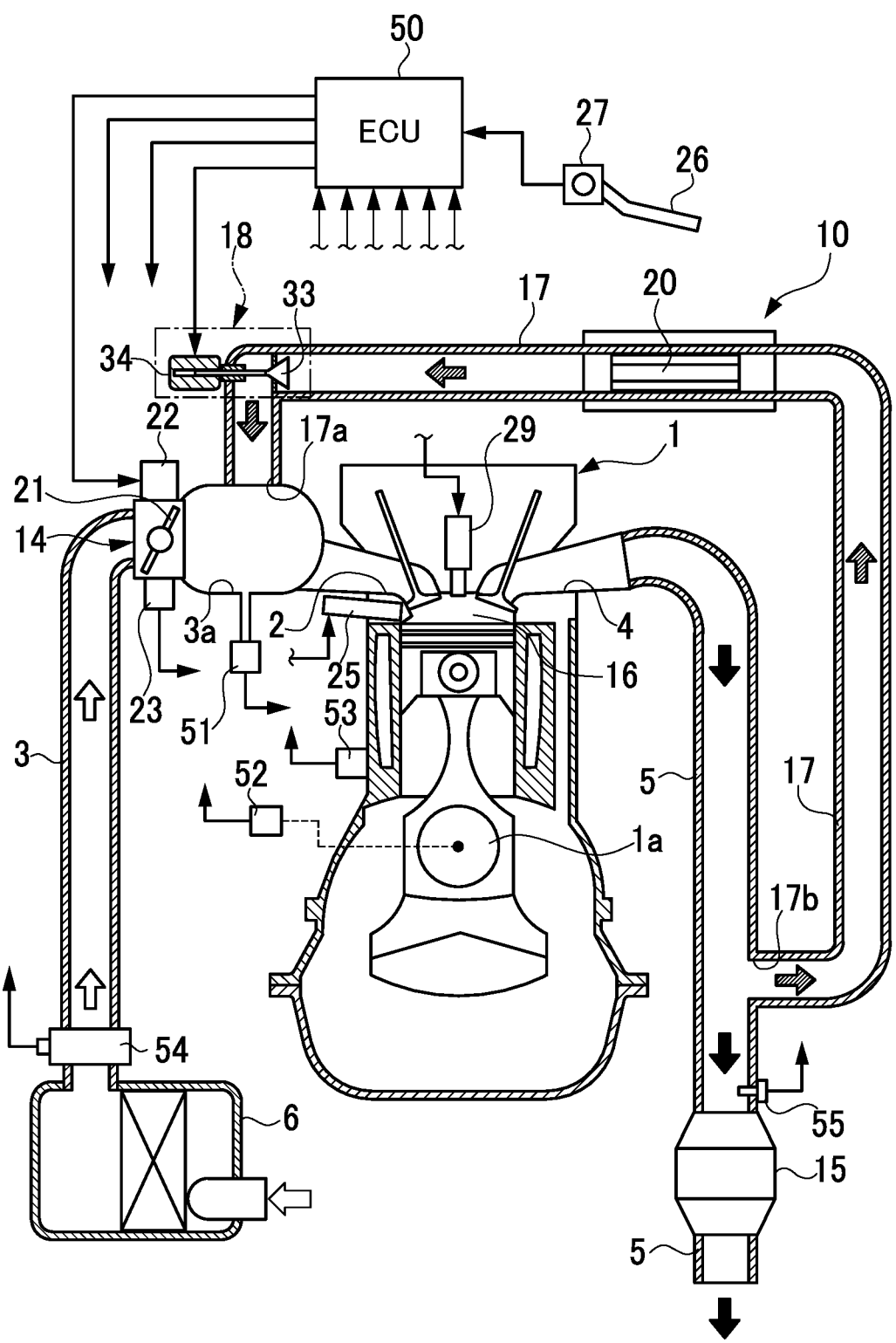
FIG. 1 is a schematic configuration diagram of an engine system in an embodiment.

FIG. 1 is a schematic configuration diagram showing a gasoline engine system (hereinafter, simply referred to as an "engine system") in the present embodiment. This engine system is provided with a reciprocating engine 1. This engine 1 includes an intake port 2 connected to an intake passage 3 and an exhaust port 4 connected to an exhaust passage 5. At an inlet of the intake passage 3, an air cleaner 6 is provided.

In the intake passage 3, a surge tank 3a is provided and, upstream of the surge tank 3, an electronic throttle device 14 is placed. The electronic throttle device 14 includes a throttle valve 21, a DC motor 22 to drive the throttle valve 21 to open and close, and a throttle sensor 23 to detect an opening degree TA of the throttle valve 21 (i.e., a throttle opening degree). The electronic throttle device 14 is configured such that the opening degree of the throttle valve 21 is adjusted by driving of the DC motor 22 according to an accelerator pedal 26 operated by a driver. The electronic throttle device 14 corresponds to one example of an output adjusting unit in the present disclosure. In the exhaust passage 5, a catalytic converter 15 is provided to clean exhaust gas.

In the engine 1, an injector 25 is provided to inject and supply fuel into a combustion chamber 16. The fuel is supplied to the injector 25 from a fuel tank (not shown). The injector 25 corresponds to one example of a fuel supply unit in the present disclosure. In the engine 1, furthermore, an ignition device 29 is provided to ignite air-fuel mixture made of fuel and intake air in the combustion chamber 16.

This engine system is provided with a high-pressure-loop exhaust gas recirculation device (an EGR device) 10. This EGR device 10 is a device configured to allow part of exhaust gas discharged from the combustion chamber 16 of the engine 1 to the exhaust passage 5 to recirculate as exhaust recirculation gas (EGR gas) into the combustion chamber 16. The EGR device 10 includes an exhaust gas recirculation passage (an EGR passage) 17 configured to allow the EGR gas to flow from the exhaust passage 5 to the intake passage 3, and an exhaust gas recirculation valve (an EGR valve) 18 provided in the EGR passage 17 to regulate the flow rate of the EGR gas in the EGR passage 17. The EGR passage 17 is provided between the exhaust passage 5 and the surge tank 3a in the intake passage 3. Specifically, an outlet 17a of the EGR passage 17 is connected to the surge tank 3a downstream of the electronic throttle device 14. An inlet 17b of the EGR passage 17 is connected to the exhaust passage 5 upstream of the catalytic converter 15.

In the EGR passage 17, an EGR cooler 20 is provided to cool the EGR gas flowing through the EGR passage 17. The EGR valve 18 is placed in the EGR passage 17 downstream of the EGR cooler 20.

(Configuration of EGR Valve)

Figure 2:
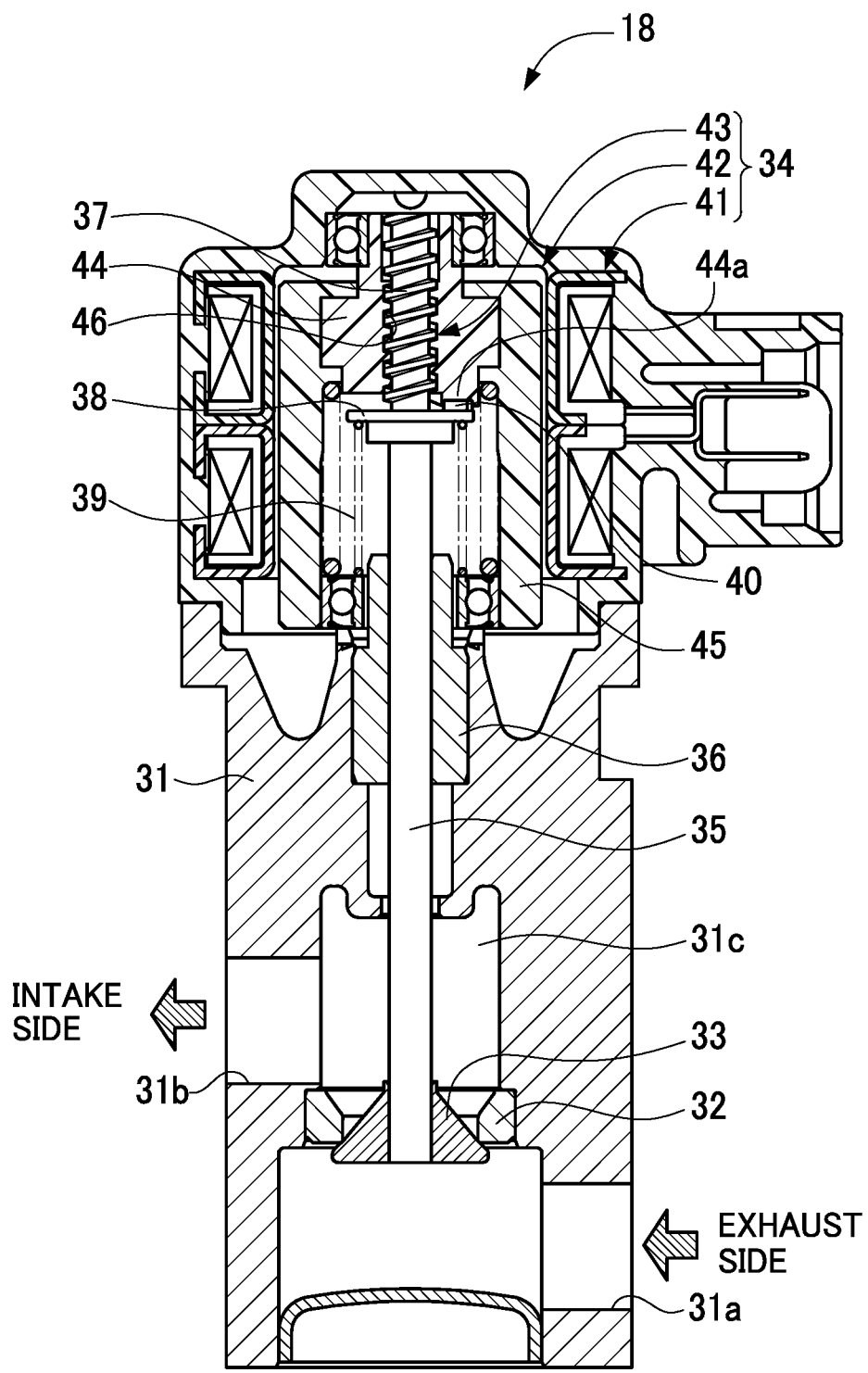
FIG. 2 is a cross-sectional view showing a configuration of an EGR valve in the embodiment.
Figure 3:
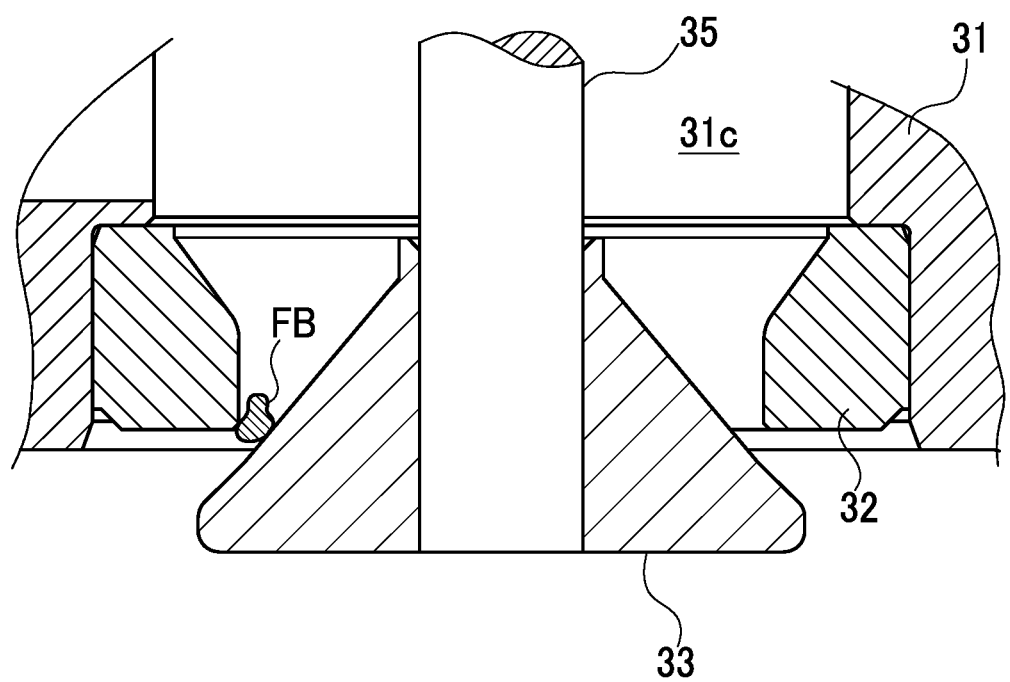
FIG. 3 is an enlarged cross-sectional view showing a part of the EGR valve in the embodiment.

FIG. 2 is a cross-sectional view showing the configuration of the EGR valve 18. FIG. 3 is an enlarged cross-sectional view showing a part of the EGR valve 18. As shown in FIG. 2, the EGR valve 18 is constituted of a motor-operated poppet valve. Specifically, the EGR valve 18 includes a housing 31, a valve seat 32 provided in the housing 31, a valve element 33 provided to be capable of seating on and moving with respect to the valve seat 32 in the housing 31, and a step motor 34 to perform a stroke movement of the valve element 33. The housing 31 includes an inlet port 31a through which EGR gas flows therein from a side close to the exhaust passage 5 (i.e., an exhaust side), an outlet port 31b through which EGR gas flows out to a side close to the intake passage 3 (i.e., an intake side), and a communication passage 31c to provide communication between the inlet port 31a and the outlet port 31b. The valve seat 32 is placed midway in the communication passage 31c.

The step motor 34 includes an output shaft 35 configured to perform linear reciprocation (stroke movement). The valve element 33 is fixed to a leading end of the output shaft 35. The output shaft 35 is supported to be capable of performing a stroke movement with respect to the housing 31 through a bearing 36 provided in the housing 31. The output shaft 35 is formed, at its upper end, with a male thread part 37. The output shaft 35 is further provided, at its midpoint (near the lower end of the male thread part 37), with a spring rest 38. This spring rest 38 has a lower surface serving as a receiving face for a compression spring 39 and an upper surface with a stopper 40 formed thereon.

The valve element 33 has a conical shape with a conical surface configured to contact with or separate from the valve seat 32. When the valve element 33 contacts with the valve seat 32, the valve element 33 is fully closed. When the valve element 33 separates from the valve seat 32, the valve element 33 is opened. The valve element 33 is urged by the compression spring 39 placed between the spring rest 38 and the housing 31 toward the step motor 34, that is, in a valve closing direction to seat on the valve seat 32. By the stroke movement of the output shaft 35 of the step motor 34, the valve element 33 in a fully-closed state is moved against the urging force of the compression spring 39, thus separating from the valve seat 32, that is, establishing a valve-open state. During this valve opening, the valve element 33 is moved toward an upstream side (the exhaust side) of the EGR passage 17. In this EGR valve 18, as above, the valve element 33 is moved from the fully-closed state in which the valve element 33 seats on the valve seat 32 toward the upstream side of the EGR passage 17 against the exhaust pressure or the intake pressure of the engine 1, so that the valve element 33 separates from the valve seat 32 into a valve-open state. On the other hand, the valve element 33 is moved from the valve-open state in the urging direction of the compression spring 39 by the output shaft 35 of the step motor 34, so that the valve element 33 comes near the valve seat 32 and then comes into a valve-closed state. During this valve closing, the valve element 33 is moved toward a downstream side (the intake side) of the EGR passage 17.

In the present embodiment, the output shaft 35 of the step motor 34 is caused to perform a stroke movement to adjust the opening degree of the valve element 33 with respect to the valve seat 32. The output shaft 35 of the EGR valve 18 is provided to be capable of performing a stroke movement by a predetermined stroke from the fully-closed state in which the valve element 33 seats on the valve seat 32 to the fully-open state in which the valve element 33 is most apart from the valve seat 32.

The step motor 34 includes a coil 41, a magnet rotor 42, and a conversion mechanism 43. The step motor 34 is configured such that the magnet rotor 42 is rotated by the predetermined number of motor steps when the coil 41 is excited by energization, thereby causing the conversion mechanism 43 to convert the rotational movement of the magnet rotor 42 to the stroke movement of the output shaft 35. Along with this stroke movement of the output shaft 35, the valve element 33 also makes a stroke movement with respect to the valve seat 32.

The magnet rotor 42 includes a rotor body 44 made of resin and a ring-shaped plastic magnet 45. The rotor body 44 is formed, at its center, with a female thread part 46 which is threadedly mounted on the male thread part 37 of the output shaft 35. When the rotor body 44 is rotated while the female thread part 46 of the rotor body 44 screws together with the male thread part 37 of the output shaft 35, the rotational movement of the rotor body 44 is converted into the stroke movement of the output shaft 35. Herein, the male thread part 37 and the female thread part 46 constitute the foregoing conversion mechanism 43. The rotor body 44 is formed, on its lower end, with a contact part 44a with which the stopper 40 of the spring rest 38 can abut. During full-closing of the EGR valve 18, the end face of the stopper 40 comes in surface contact with the end face of the contact part 44a to restrict an initial position of the output shaft 35.

In the present embodiment, the number of motor steps of the step motor 34 is changed in stages to thereby adjust the opening degree of the valve element 33 of the EGR valve 18, minutely step by step, from the fully-closed state to the fully-open state.

(Electric Configuration of Engine System)

The engine system in the present embodiment includes an electric control unit (ECU) 50 responsible for various controls as shown in FIG. 1. The ECU 50 is configured to control the injector 25, the ignition device 29, the electronic throttle device 14 (the DC motor 22), and the EGR valve 18 (the step motor 34) according to the operating state of the engine 1. The ECU 50 is further configured to output predetermined command signals to the motors 34 and 22 to respectively control the EGR valve 18 and the electronic throttle device 14. The ECU 50 includes a central processing unit (CPU), various memories for storing in advance predetermined control programs and others and temporarily storing calculation results of the CPU and others, and an external input circuit and an external output circuit connected to those unit and memories. The ECU 50 corresponds to one example of a controller in the present disclosure. The external output circuit is connected to the injector 25, the ignition device 29, the electronic throttle device 14 (the DC motor 22), and the EGR valve 18 (the step motor 34). The external input circuit is connected to the throttle sensor 23 and additionally various sensors 27 and 51 to 55 to detect the operating state of the engine 1. The various sensors 23, 27, and 51 to 55 correspond to one example of an operating-state detecting unit in the present disclosure.

Herein, as the various sensors, there are provided the throttle sensor 23 and additionally an accelerator sensor 27, an intake pressure sensor 51, a rotation number sensor 52, a water temperature sensor 53, an airflow meter 54, and an air-fuel ratio sensor 55. The accelerator sensor 27 is configured to detect an operation amount of the accelerator pedal 26 as an accelerator opening degree ACC and output a detection signal representative thereof. The intake pressure sensor 51 is configured to detect the pressure in the surge tank 3a located downstream of the electronic throttle device 14 as an intake pressure PM and output a detection signal representative thereof. The rotation number sensor 52 is configured to detect a rotation angle (i.e., a crank angle) of a crank shaft 1a of the engine 1 and detect a change in crank angle (i.e., a crank angular velocity) as the number of rotations of the engine 1 (i.e., an engine rotation number) NE, and output a detection signal representative thereof. The water temperature sensor 53 is configured to detect the temperature of cooling water flowing through the inside of the engine 1, as a cooling water temperature THW, and output a detection signal representative thereof. The airflow meter 54 is configured to detect the intake amount Ga of intake air flowing in the intake passage 3 directly downstream of the air cleaner 6 and output a detection signal representative thereof. The air-fuel ratio sensor 55 is configured to detect an air-fuel ratio A/F of exhaust gas in the exhaust passage 5 directly upstream of the catalytic converter 15 and output a detection signal representative thereof.

In the present embodiment, the ECU 50 is configured to control the EGR valve 18 to execute EGR control according to the operating state of the engine 1 in all operation regions of the engine 1. On the other hand, during deceleration of the engine 1, when fuel supply to the engine 1 is cut off (i.e., during deceleration fuel cut), the ECU 50 is configured to control the EGR valve 18 to be fully closed in order to shut off a flow of EGR gas.

Herein, the EGR valve 18 may cause a problem due to lodging or adhering of a foreign-mater FB such as deposits between the valve seat 32 and the valve element 33 as shown in FIG. 3. In the present embodiment, therefore, the ECU 50 is configured to execute "Foreign-matter lodging diagnosis control" to diagnose an "abnormality in opening or closing of the EGR valve 18" including lodging of a foreign matter or substance FB. Furthermore, if this foreign-matter lodging diagnosis results in the determination that a foreign matter FB is lodged in the EGR valve 18, the ECU 50 is configured to execute, during deceleration of the engine 1, idle-up control to avoid misfire and engine stall of the engine 1 due to EGR gas leaking out of the EGR valve 18 and foreign-matter removal control to remove the foreign matter FB. Moreover, there may be a case where the step motor 34 constituting the EGR valve 18 falls out of step. In the present embodiment, accordingly, the ECU 50 is configured to diagnose step-out of the step motor 34 and perform the control to resolve the step-out in association with the foreign-matter lodging diagnosis of the EGR valve 18.

(Foreign-Matter Lodging Diagnosis Control)

Figure 4:
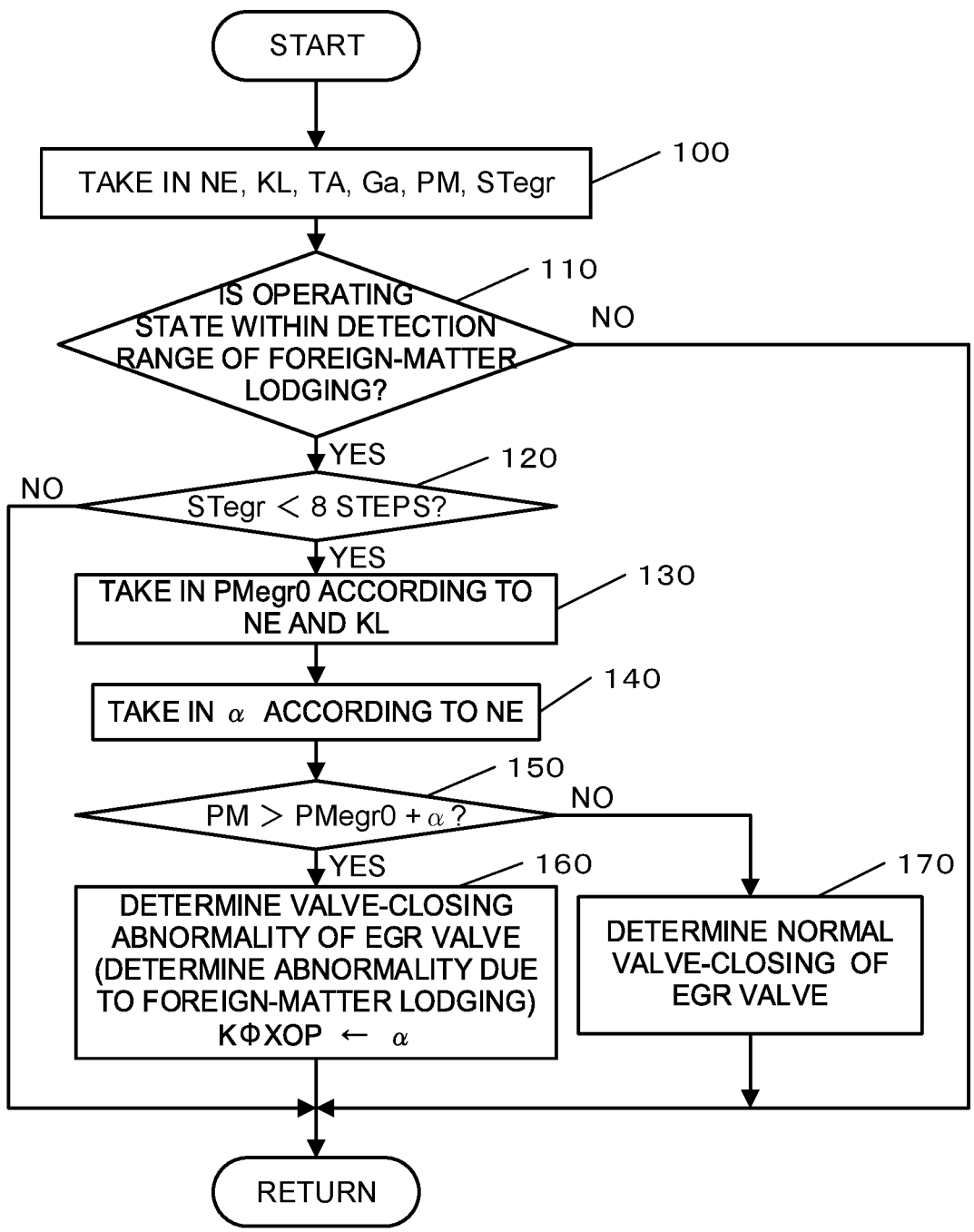
FIG. 4 is a flowchart showing details of foreign-matter lodging diagnosis control in the embodiment.

The foreign-matter lodging diagnosis control of the EGR valve 18 will be described first. FIG. 4 is a flowchart showing one example of the details of this control. This flowchart shows processing details to diagnose whether or not abnormality due to foreign-matter lodging exists in the EGR valve 18, during deceleration of the engine 1, when the EGR valve 18 is subjected to full-closing control or valve-closing control.

When the processing enters this routine, in step 100, the ECU 50 first takes in various signals representing an operating state of the engine 1 from various sensors and others 23, 51, 52, and 54. Specifically, the ECU 50 takes in each of the engine rotation number NE, an engine load KL, the throttle opening degree TA, the intake amount Ga and the intake pressure PM, and the number of motor steps (i.e., a motor step number) STegr of the step motor 34 corresponding to the opening degree of the EGR valve 18. Herein, the ECU 50 can obtain the engine load KL based on the throttle opening degree TA or the intake pressure PM. Further, the motor step number STegr has a proportional relation to the opening degree of the EGR valve 18 (i.e., an EGR opening degree), that is, the opening degree of the valve element 33 relative to the valve seat 32.

In step 110, the ECU 50 determines whether or not the operating state of the engine 1 falls within the foreign-matter lodging detection range. The ECU 50 can judge for example whether or not the range defined based on the relationship between the engine rotation number NE and the engine load KL falls within a predetermined detection range appropriate for foreign-matter lodging detection. This predetermined detection range includes deceleration running or steady running of the engine 1. If this determination results in an affirmative answer (YES), the ECU 50 advances the processing to step 120. If this determination results in a negative answer (NO), the ECU 50 returns the processing to step 100.

In step 120, the ECU 50 determines whether or not the motor step number STegr is smaller than "8 steps". This value, "8 steps", is one example and corresponds to a minute opening degree of the EGR valve 18. If this determination results in YES, the ECU 50 advances the processing to step 130. If this determination results in NO, the ECU 50 returns the processing to step 100.

Figure 5:
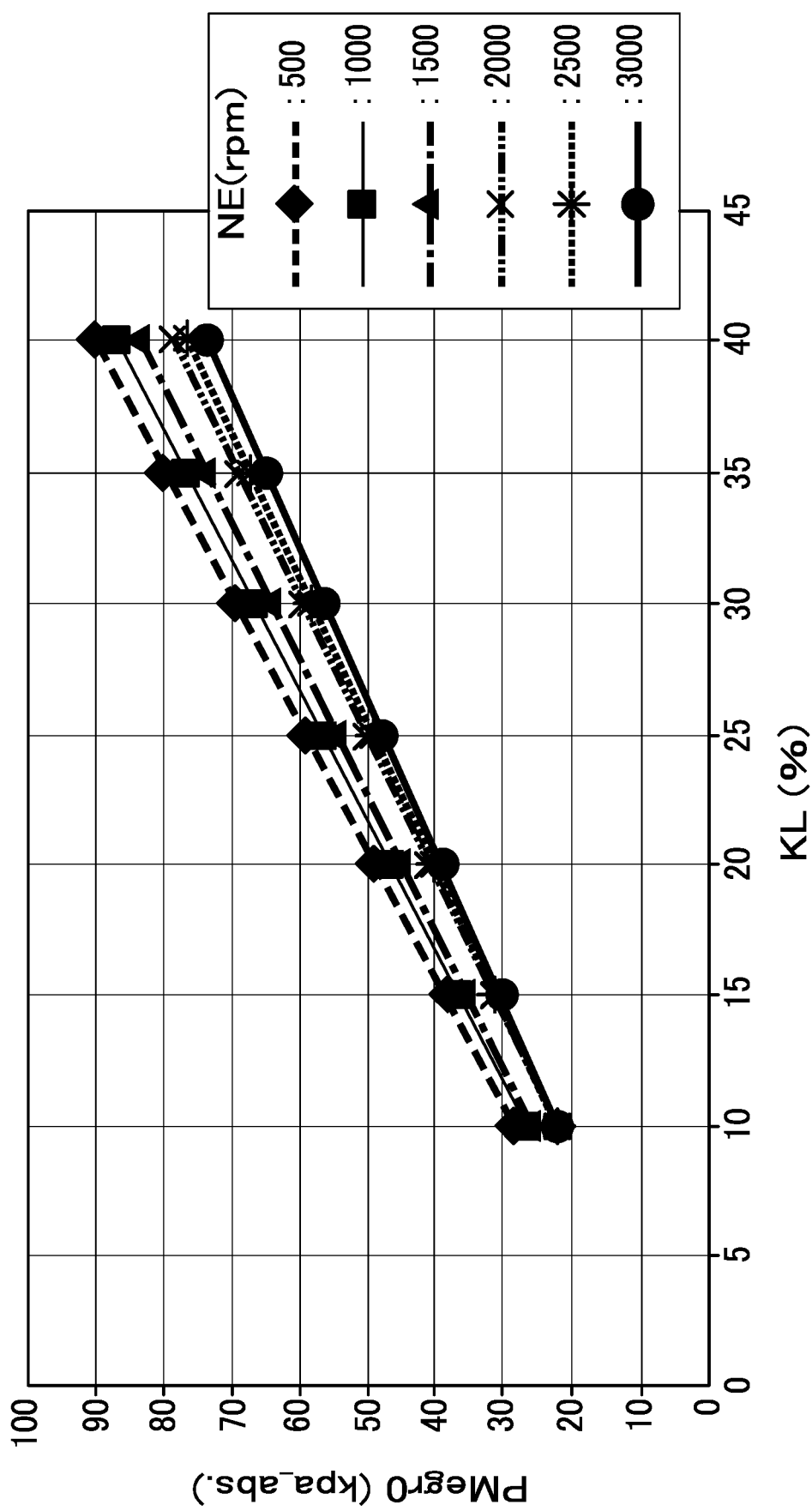
FIG. 5 is a full-closing reference intake pressure map to be referred to obtain a full-closing reference intake pressure during deceleration according to the number of engine rotations and engine load in the embodiment.

In step 130, the ECU 50 takes in a full-closing reference intake pressure PMegr0 during deceleration according to the engine rotation number NE and the engine load KL. The ECU 50 can obtain this during-deceleration full-closing reference intake pressure PMegr0 according to the engine rotation number NE and the engine load KL by for example referring to a full-closing reference intake pressure map set in advance as shown in FIG. 5. This full-closing reference intake pressure map is a map previously set to define the relationship of the full-closing reference intake pressure PMegr0 to the engine rotation number NE and the engine load KL when the opening degree of the valve element 33 of the EGR valve 18 (i.e., the EGR opening degree) is 0, that is, during full closing. Herein, the intake pressure PM during deceleration of the engine 1 generally intercorrelates with the engine load KL irrespective of the presence or absence of a foreign matter lodged in the EGR valve 18. The intake pressure PM and the engine load KL are almost proportional to each other. However, the intake pressure PM changes according to the engine rotation number NE. In FIG. 5, therefore, the full-closing reference intake pressure PMegr0 is set with respect to the engine rotation number NE and the engine load KL.

In step 140, subsequently, the ECU 50 takes in a pressure-increase allowance a according to the engine rotation number NE. The ECU 50 can obtain this pressure-increase allowance α by referring to a predetermined map set in advance. This pressure-increase allowance α is added to the full-closing reference intake pressure PMegr0 to permit errors or the like in the determination mentioned later.

In step 150, the ECU 50 then determines whether or not the detected intake pressure PM is larger than a result value obtained by adding up the full-closing reference intake pressure PMegr0 and the pressure-increase allowance α. If this determination results in YES, the ECU 50 advances the processing to step 160. If this determination results in NO, the ECU 50 shifts the processing to step 170.

In step 160, the ECU 50 determines that the EGR valve 18 is abnormal because of foreign-matter lodging, i.e., the EGR valve 18 has valve-opening abnormality, and stores this determination result in a memory. Further, the ECU 50 has stored a map showing a relationship between the diameter of a lodged foreign matter and the pressure increase allowance α that changes with the foreign-matter diameter. In step 160, the ECU 50 executes the abnormality determination of foreign-matter lodging and obtains a lodged foreign-matter diameter KΦXOP corresponding to the pressure increase allowance α taken in step 140 by referring to the stored map, and stores the obtained lodged foreign-matter diameter in the memory. The ECU 50 can further execute a predetermined abnormality informing control in response to the determination result indicating the valve-opening abnormality. Thereafter, the ECU 50 returns the processing to step 100.

On the other hand, in step 170, the ECU 50 determines that the EGR valve 18 has been normally placed in a fully-closed state (Normal valve-closing) and returns the processing to step 100.

According to the foregoing foreign-matter lodging diagnosis control, the ECU 50 is configured to diagnose the abnormality in opening/closing of the EGR valve 18 (i.e., the foreign-matter lodging abnormality) based on the detected operating state (the intake pressure PM) of the engine 1. When it is determined that the abnormality exists, the ECU 50 is configured to calculate the level of the abnormality (the diameter of the foreign matter FB (the lodged foreign-matter diameter KXOP) lodged between the valve seat 32 and the valve element 33) based on the detected intake pressure PM.

According to the foregoing foreign-matter lodging diagnosis control, during deceleration of the engine 1, when the EGR valve 18 is subjected to the full-closing control or valve-closing control, the ECU 50 is configured to obtain the full-closing reference intake pressure PMegr0 according to the EGR opening degree, engine rotation number NE, and engine load KL by referring to the full-closing reference intake pressure map. Further, the ECU 50 is configured to compare the full-closing reference intake pressure PMegr0 and the detected intake pressure PM to thereby diagnose the presence or absence of the abnormality (the foreign-matter lodging abnormality) in opening/closing of the EGR valve 18.

(Idle-Up Control, Foreign-Matter Removal Control, Control for Diagnosing and Resolving Step-Out)

Figure 6:
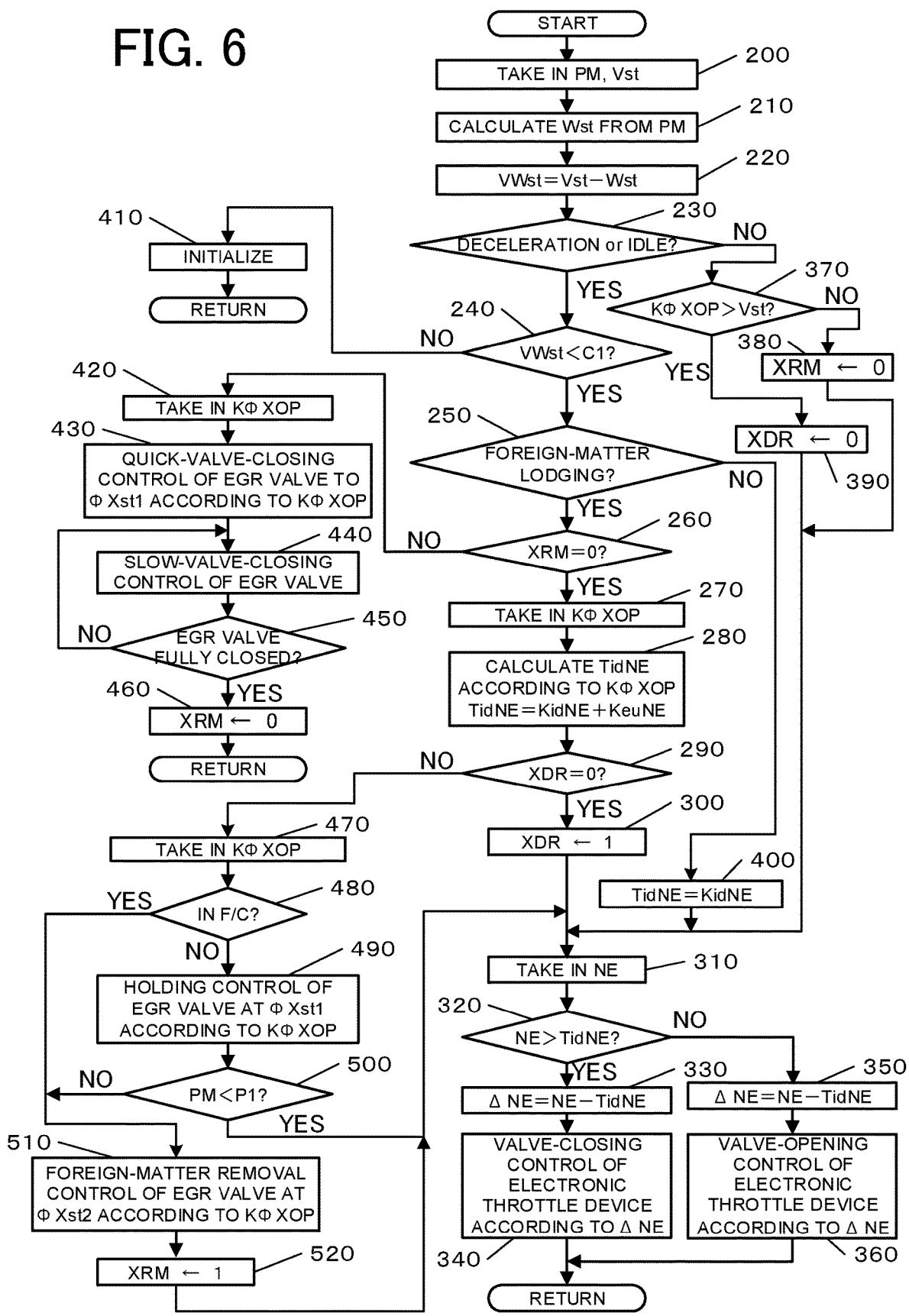
FIG. 6 is a flowchart showing details of idle-up control, foreign-matter removal control, control for diagnosing and resolving step-out in the embodiment.

The following description is given to the idle-up control, the foreign-matter removal control, the control for diagnosing and resolving step-out of the EGR valve 18 to be executed in relation to the foregoing foreign-matter lodging diagnosis control. FIG. 6 is a flowchart showing one example of the details of this control.

When the processing enters this routine, in step 200, the ECU 50 first takes in the intake pressure PM based on a detection value of the intake pressure sensor 51 and also takes in the commanded number of steps (a commanded step number) Vst instructed as a target opening degree of the EGR valve 18 to the step motor 34.

In step 210, based on the taken intake pressure PM, the ECU 50 calculates the estimated number of steps (an estimated step number) Wst of the step motor 34 which should correspond to an actual opening degree of the EGR valve 18. The ECU 50 can obtain this estimated step number Wst according to the intake pressure PM by for example referring to a predetermined estimated step number map (not shown).

In step 220, successively, the ECU 50 subtracts the estimated step number Wst from the commanded step number Vst to calculate a step-out value VWst of the step motor 34. Herein, when the rotational operation of the magnet rotor 42 constituting the step motor 34 properly follows the commanded step number Vst (i.e., in the absence of step-out), the step-out value VWst is 0. On the other hand, when the rotational operation of the magnet rotor 42 does not properly follow the commanded step number Vst (i.e., in the presence of step-out) and the estimated step number Wst is larger than the commanded step number Vst, the step-out value VWst is a negative value. When the rotational operation of the magnet rotor 42 does not properly follow the commanded step number Vst (i.e., in the presence of step-out) and the estimated step number Wst is smaller than the commanded step number Vst, the step-out value VWst is a positive value.

In step 230, subsequently, the ECU 50 determines whether or not the operation of the engine 1 is deceleration or idle. The ECU 50 can make this determination for example based on the throttle opening degree TA and the engine rotation number NE. If this determination results in YES, the ECU 50 advances the processing to step 240. If this determination results in NO, the ECU 50 shifts the processing to step 370.

In step 240, the ECU 50 determines whether or not the step-out value VWst is smaller than a predetermined reference value C1. This reference value C1 is a value indicating that the step motor 34 is out of step. If this determination results in NO (the step motor 34 is out of step), the ECU 50 advances the processing to step 410. On the other hand, if his determination results in YES (the step motor 34 is not out of step), the ECU 50 shifts the processing to step 250.

In step 410, the ECU 50 initializes the command to the step motor 34 in order to resolve the step-out and thereafter returns the processing to step 200. In other words, when the ECU 50 diagnoses whether or not the step motor 34 is out of step and judges that the step motor 34 is out of step during deceleration or idle of the engine 1, the ECU 50 initializes the command to control the step motor 34.

In step 250, on the other hand, the ECU 50 determines whether or not foreign-matter lodging exists in the EGR valve 18. The ECU 50 can make this determination based on the result of the foregoing foreign-matter lodging diagnosis control. If this determination results in YES, the ECU 50 advances the processing to step 260. If this determination results in NO, the ECU 50 shifts the processing to step 400.

In step 260, the ECU 50 determines whether or not a foreign-matter removal flag XRM is 0. This flag is set to 1 when the foreign-matter removal control is executed for the EGR valve 18 or is set to 0 when that control is not executed. If this determination results in YES (the foreign-matter removal control has not been executed), the ECU 50 advances the processing to step 270. If this determination results in NO (the foreign-matter removal control has already been executed), the ECU 50 shifts the processing to step 420.

In step 270, the foreign-matter removal control has not been executed and thus the ECU 50 takes in the lodged foreign-matter diameter KΦXOP stored in the foreign-matter lodging diagnosis control.

In step 280, the ECU 50 then calculates a target idle rotation number TidNE according to the lodged foreign-matter diameter KΦXOP. Specifically, the ECU 50 obtains the target idle rotation number TidNE by adding an idle-up rotation number KeuNE according to the lodged foreign-matter diameter KΦXOP to a predetermined basic idle rotation number KidNE (a fixed value).

Figure 7:
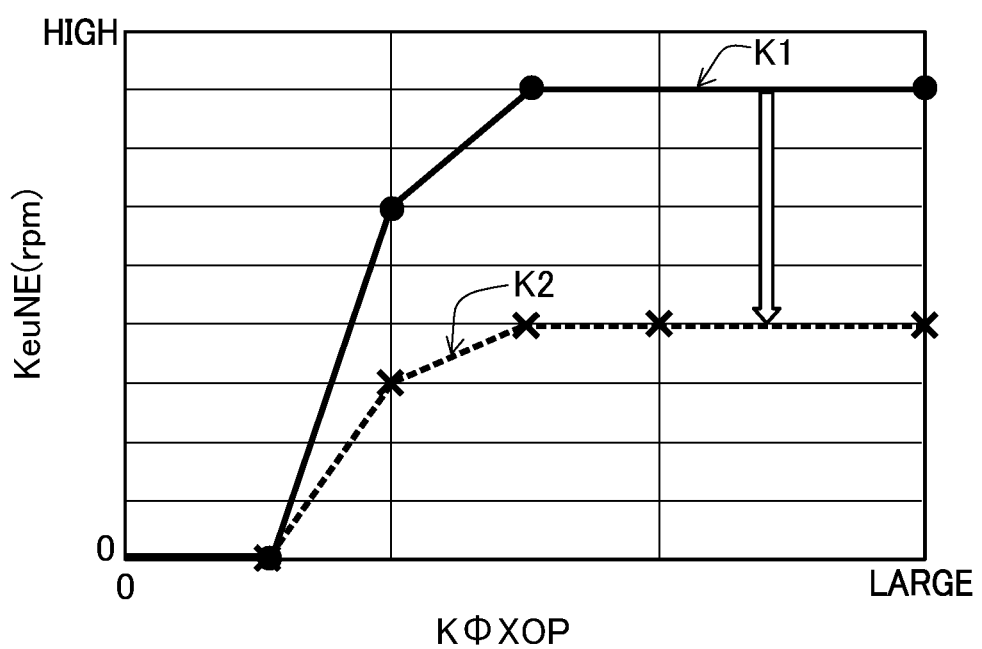
FIG. 7 is an idle-up rotation number map to be referred to obtain the number of rotations for idle-up according to a lodged foreign-matter diameter in the embodiment.
Figure 8:
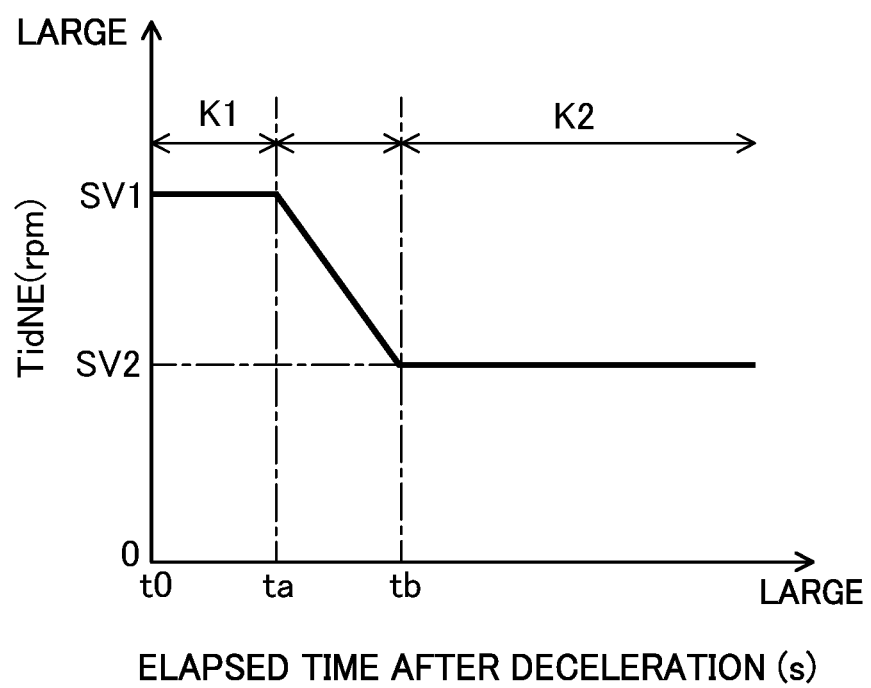
FIG. 8 is a graph showing variations in target idle rotation number according to elapsed time after deceleration in the embodiment.

Herein, the ECU 50 can obtain the idle-up rotation number KeuNE according to the lodged foreign-matter diameter KΦXOP by referring to an idle-up rotation map as shown in FIG. 7. In FIG. 7, a solid line (a thick line) indicates a first increased amount K1 to avoid engine stall and a broken line indicates a second increased amount K2 to maintain idle or improve deceleration performance. The ECU 50 is further configured to change the target idle rotation number TidNE according to an elapsed time after deceleration, i.e., from when the deceleration is determined, as shown in a graph of FIG. 8. Specifically, as shown in FIG. 8, until time ta is reached after a predetermined time elapses from deceleration start time t0, the ECU 50 sets the target idle rotation number TidNE to a first set value SV1 to avoid engine stall. After the predetermined time has elapsed, that is, after time ta, the ECU 50 shifts to a second set value SV2 lower than the first set value SV1. Further, the ECU 50 is configured to keep the first set value SV1 constant for a period from deceleration start time t0 to time ta, keep the second set value SV2 constant after time tb (tb>ta), and decrease the first set value SV1 to the second set value SV2 for a period from time ta to time tb. Herein, the ECU 50 obtains the first set value SV1 based on the first increased amount K1 and the second set value SV2 based on the second increased amount K2. The foregoing times ta and tb can be any values.

Herein, the first set value SV1 is a set value that can sufficiently avoid engine stall. However, it is set so as not to limit deceleration of the engine 1 more than necessary. The second set value SV2 is a set value to maintain idle or improve deceleration performance and also a set value that can avoid engine stall. The basic idle rotation number KidNE constituting the target idle rotation number TidNE (the first set value SV1 and the second set value SV2) is not a value that can avoid engine stall by itself.

In step 290, thereafter, the ECU 50 determines whether or not a deceleration flag XDR is 0. This flag XDR is set to 1 when the engine 1 has been determined to be in deceleration or idle before this time or set to 0 when this determination has not been made as described later. If this determination results in YES, the ECU 50 advances the processing to step 300. If this determination results in NO, the ECU 50 shifts the processing to step 470.

In step 300, the engine 1 is determined this time to be in deceleration or idle and thus the ECU 50 sets the deceleration flag XDR to 1.

In step 310, successively, the ECU 50 takes in the engine rotation number NE based on a detection value of the rotation number sensor 52.

In step 320, the ECU 50 then determines whether or not the taken engine rotation number NE is higher than the target idle rotation number TidNE. If this determination results in YES, the ECU 50 advances the processing to step 330. If this determination results in NO, the ECU 50 shifts the processing to step 350.

In step 330, the ECU 50 calculates a difference of the target idle rotation number TidNE from an actual engine rotation number NE, as a rotation-number difference ΔNE. In this case, the rotation-number difference ΔNE is a positive value.

In step 340, the ECU 50 performs valve-closing control of the electronic throttle device 14 according to the rotation-number difference ΔNE. In other words, the ECU 50 controls the electronic throttle device 14 to be closed to reduce the engine rotation number NE toward the target idle rotation number TidNE. Thereafter, the ECU 50 returns the processing to step 200.

In step 350, on the other hand, the ECU 50 calculates a difference of the target idle rotation number TidNE from the actual engine rotation number NE, as the rotation-number difference ΔNE. In this case, the rotation-number difference ΔNE is a negative value.

In step 360, the ECU 50 performs valve-opening control of the electronic throttle device 14 according to the rotation-number difference ΔNE. In other words, the ECU 50 controls the electronic throttle device 14 to be opened to increase the engine rotation number NE toward the target idle rotation number TidNE. Thereafter, the ECU 50 returns the processing to step 200.

On the other hand, in step 370 following step 230, the ECU 50 determines whether or not the lodged foreign-matter diameter KΦXOP is larger than the commanded step number Vst. If this determination results in YES, the ECU 50 advances the processing to step 390. this determination results in NO, the ECU 50 shifts the processing to step 380

In step 380, the foreign-matter removal control has not been executed and thus the ECU 50 sets the foreign-matter removal flag XRM to 0 and shifts the processing to step 310.

In step 390, the engine 1 has not been determined to be in deceleration or idle and thus the ECU 50 sets the deceleration flag XDR to 0 and shifts the processing to step 310.

In step 400 following step 250, furthermore, no foreign-matter lodging exists in the EGR valve 18 and thus the ECU 50 obtains the basic idle rotation number KidNE as the target idle rotation number TidNE and shifts the processing to step 310. This target idle rotation number TidNE does not include the idle-up rotation number KeuNE and thus this target idle rotation number TidNE is a value that is lower than the target idle rotation number TidNE corresponding to the case in which foreign-matter lodging exists and that does not contribute to idle up, that is, a value that cancels idle up.

On the other hand, in step 420 following step 260, the ECU 50 takes in the lodged foreign-matter diameter KΦXOP stored in the foreign-matter lodging diagnosis control.

Figure 9:
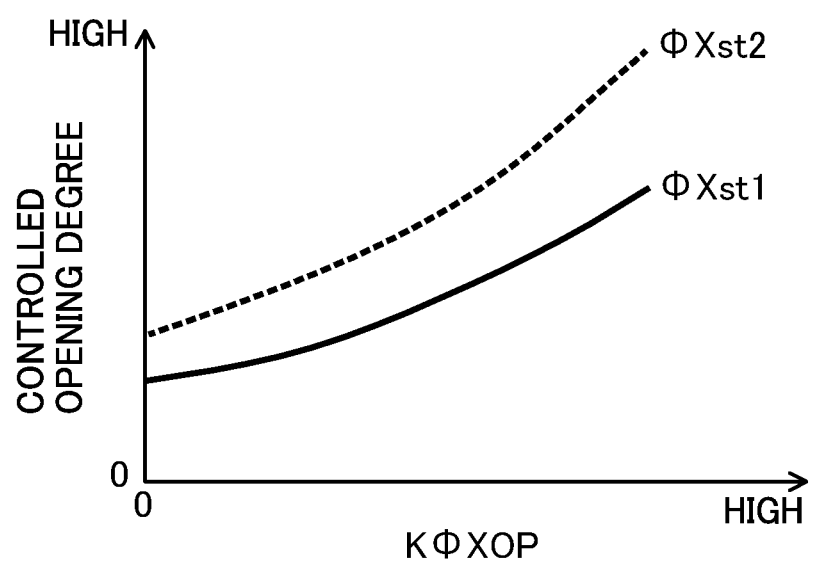
FIG. 9 is a controlled opening degree map to be referred to obtain a first opening degree and a second opening degree according to a lodged foreign-matter diameter in the embodiment.

In step 430, the ECU 50 then performs quick-valve-closing control of the EGR valve 18 to a first opening degree ΦXst1 according to the lodged foreign-matter diameter KΦXOP, that is, controls the EGR valve 18 to be quickly closed. Herein, the ECU 50 can obtain the first opening degree ΦXst1 according to the lodged foreign-matter diameter KΦXOP by referring to a controlled opening degree map as shown in FIG. 9. In FIG. 9, a solid line (a thick line) indicates the first opening degree ΦXst1 and a broken line represents a second opening degree ΦXst2 which will be described later. The second opening degree ΦXst2 is set to be higher than the first opening degree ΦXst1.

In step 440, successively, the ECU 50 performs slow-valve-closing control of the EGR valve 18 at a slower speed than a normal valve closing speed, that is, controls the EGR valve 18 to be slowly closed. For this purpose, the ECU 50 controls the step motor 34.

In step 450, the ECU 50 then determines whether or not the EGR valve 18 is in a fully-closed state. If this determination results in NO, the ECU 50 returns the processing to step 440. If this determination results in YES, the ECU 50 shifts the processing to step 460. Herein, in the processings in step 430 to step 450, the EGR valve 18 is controlled to be quickly closed once and then slowly closed to the fully-closed state.

In step 460, the foreign-matter removal control has not been executed and thus the ECU 50 sets the foreign-matter removal flag XRM to 0 and returns the processing to step 200.

On the other hand, in step 470 following step 290, the ECU 50 takes in the lodged foreign-matter diameter KΦXOP stored in the foreign-matter lodging diagnosis control.

In step 480, the ECU 50 then determines whether or not the engine 1 is under fuel cut (F/C), that is, whether or not fuel injection from the injector 25 is temporarily stopped in association with deceleration. If this determination results in YES, the ECU 50 advances the processing to step 510. If this determination results in NO, the ECU 50 shifts the processing to step 490.

In step 490, the ECU 50 performs holding control of the EGR valve 18 at the first opening degree ΦXst1 according to the lodged foreign-matter diameter KΦXOP, that is, holds the EGR valve 18 at the first opening degree ΦXst1 smaller by a predetermined value than the second opening degree ΦXst2 required for removal of a foreign matter FB. Herein, the ECU 50 can obtain the first opening degree ΦXst1 according to the lodged foreign-matter diameter KΦXOP by referring to the controlled opening degree map as shown in FIG. 9.

In step 500, the ECU 50 then determines whether or not the intake pressure PM is lower than a predetermined reference value P1. This reference value P1 can be assigned for example 95 (kPa). If this determination results in YES (the intake pressure PM is lower than atmospheric pressure PA), the ECU 50 directly advances the processing to step 310. If this determination results in NO (the intake pressure PM is equal to or higher than atmospheric pressure PA), the ECU 50 shifts the processing to step 510.

In step 510 following step 480 or step 500, the ECU 50 executes the foreign-mater removal control of the EGR valve 18 at the second opening degree ΦXst2 according to the lodged foreign-matter diameter KΦXOP. Herein, in the case of shifting from the step 500, after the EGR valve 18 is held at the first opening degree ΦXst1, when the intake pressure PM comes close to the atmospheric pressure PA, the ECU 50 controls the step motor 34 to open the EGR valve 18 from the first opening degree ΦXst1 to the second opening degree ΦXst2 in order to remove a foreign matter from the EGR valve 18. In the case of shifting from step 480, on the other hand, after the EGR valve 18 is held at the first opening degree ΦXst1, when the engine 1 is in fuel-cut, the ECU 50 controls the step motor 34 to open the EGR valve 18 to the second opening degree ΦXst2 in order to remove a foreign matter from the EGR valve 18. In those cases, lodging of the foreign matter FB between the valve seat 32 and the valve element 33 is released, so that the foreign matter FB is peeled off or blown away from the valve seat 32 or the valve element 33 by a flow of EGR gas in the EGR passage 17. Herein, the ECU 50 can obtain the second opening degree ΦXst2 according to the lodged foreign-matter diameter KΦXOP by referring to the controlled opening degree map as shown in FIG. 9.

In step 520, the foreign-matter removal control has been executed, and thus the ECU 50 sets the foreign-matter removal flag XRM to 1 and shifts the processing to step 310.

According to the foregoing control, during deceleration of engine, when the existence of abnormality in opening/closing (foreign-matter lodging abnormality) in the EGR valve 18 and the level of the abnormality (the lodged foreign-matter diameter KΦXOP) are determined and before fuel supply to the engine 1 from the injector 25 is cut off (fuel cut), the ECU 50 is configured to control the step motor 34 to hold the EGR valve 18 at the first opening degree ΦXst1 smaller by the predetermined value than the second opening degree ΦXst2 needed to resolve the determined abnormality, or remove the foreign matter FB.

According to the foregoing control, after the EGR valve 18 is held at the first opening degree ΦXst1 and when the engine 1 is subjected to fuel-cut, the ECU 50 is configured to control the step motor 34 to open the EGR valve 18 to the second opening degree ΦXst2 in order to remove a foreign matter FB from the EGR valve 18. Furthermore, after the EGR valve 18 is held at the first opening degree ΦXst1, when the detected intake pressure PM comes close to atmospheric pressure PA, the ECU 50 is configured to control the step motor 34 to open the EGR valve 18 to the second opening degree ΦXst2 in order to remove a foreign matter FB.

According to the foregoing control, furthermore, the ECU 50 is configured to diagnose whether or not the step motor 34 is out of step based on the detected operating state (the intake pressure PM). When the step motor 34 is determined to be out of step, the ECU 50 is configured to initialize the command to control the step motor 34 during deceleration of the engine 1. When the existence of the foreign-matter lodging abnormality is determined, the ECU 50 is configured to control the step motor 34 to hold the EGR valve 18 at the first opening degree ΦXst1 and then open the EGR valve 18 to the second opening degree ΦXst2 in order to remove a foreign matter FB after initialization.

Still further, according to the foregoing control, the ECU 50 is configured to control an output adjusting unit (the electronic control device 14) according to the determined lodged foreign-matter diameter KΦXOP to avoid engine stall. After this control, and still after the EGR valve 18 is held at the first opening degree ΦXst1 and then opened to the second opening degree ΦXst2 for removal of a foreign matter FB, the ECU 50 is configured to control the step motor 34 to slowly close the EGR valve 18 at a slower speed than a normal valve-closing speed. Moreover, after controlling the step motor 34 to slowly close the EGR valve 18, the ECU 50 is configured to diagnose again the existence or nonexistence of the abnormality in opening/closing of the EGR valve 18 (the foreign-matter lodging abnormality). Only when the nonexistence of the abnormality is determined, the ECU 50 cancels the control of the electronic throttle device 14 to avoid engine stall.

Figure 10:
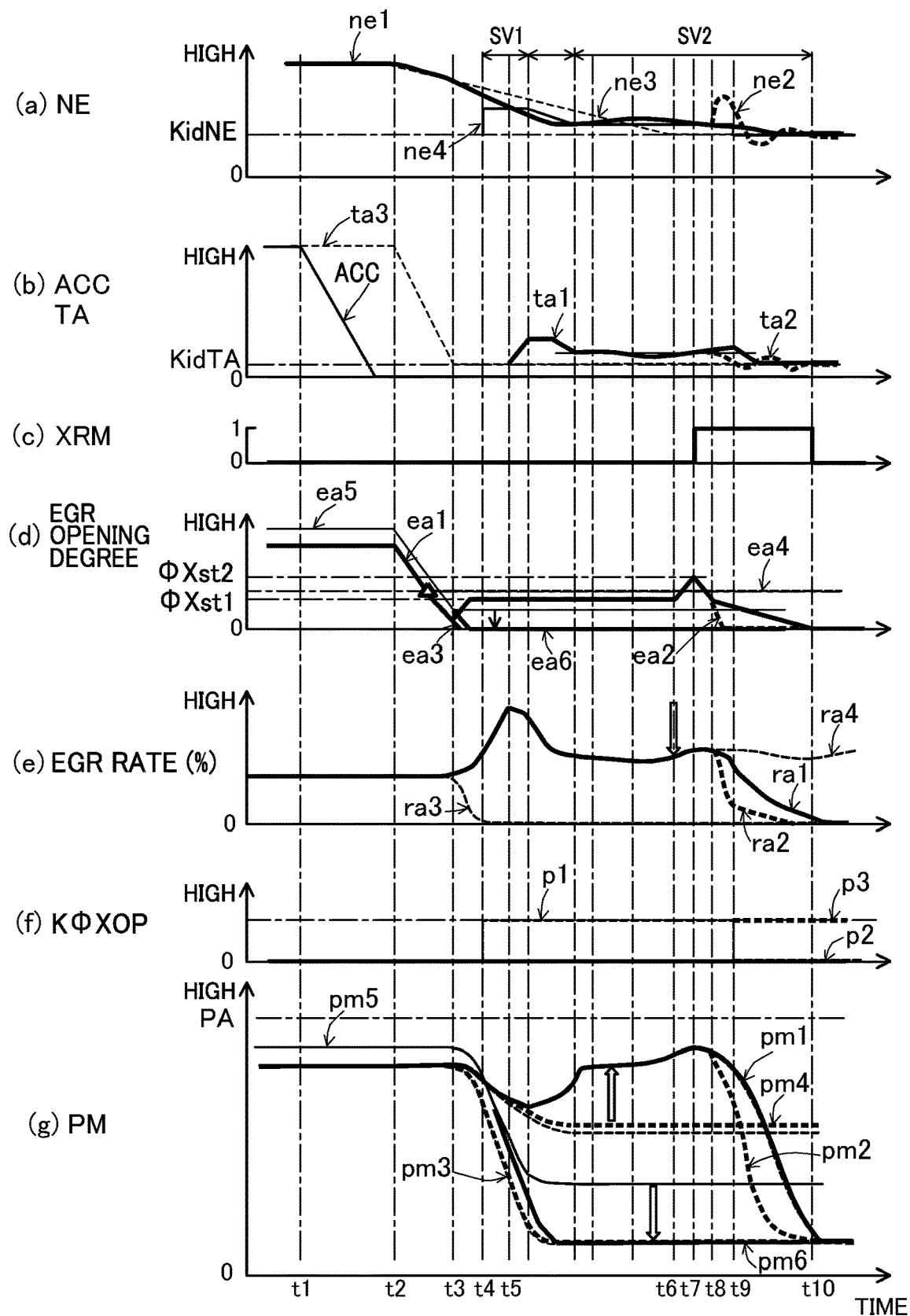
FIG. 10 is a time chart showing behaviors of various parameters during execution of the above various controls in the embodiment.
Figure 11:
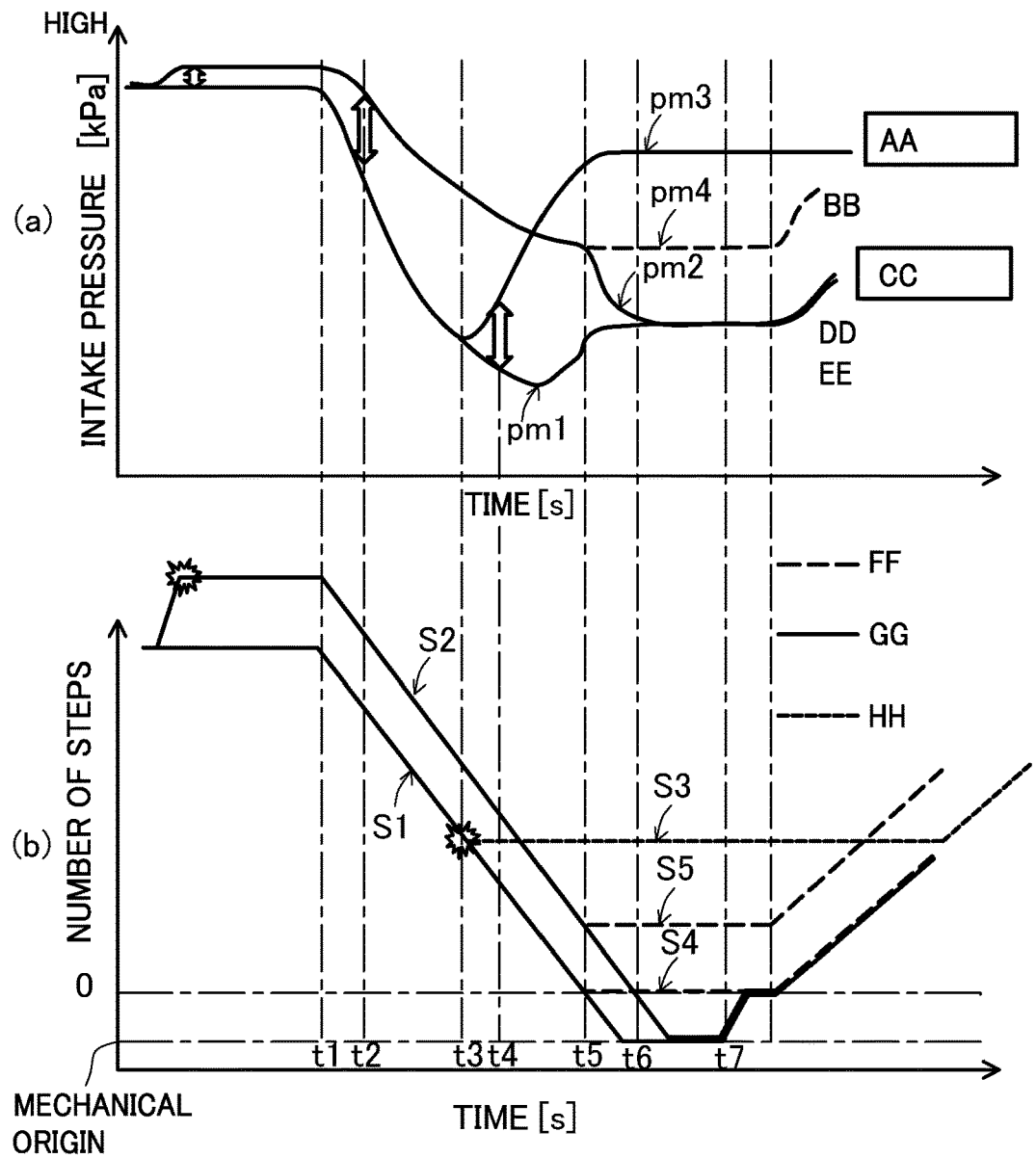
FIG. 11 is a time chart showing a relationship between engine intake pressure and the number of steps (a command value) to be outputted from an ECU to a step motor of an EGR valve in a conventional art.

Herein, FIG. 10 is a time chart showing behaviors of various parameters during execution of the foregoing various controls. In FIG. 10, (a) indicates the engine rotation number NE, (b) represents the accelerator opening degree ACC and the throttle opening degree TA, (c) indicates the foreign-matter removal flag XRM, (d) shows the EGR opening degree, (e) indicates the EGR rate, (f) represents the lodged foreign-matter diameter KΦXOP, and (g) indicates the intake pressure PM.

In FIG. 10 (a), a thick line ne1 represents a case where the idle-up control in the present embodiment is executed when a foreign matter is lodged, i.e., foreign-matter lodging exists, a thick broken line ne2 shows a case where the EGR valve 18 is quickly closed after removal of the lodged foreign matter and thus feedback control is not performed in good time, thereby causing variations in the engine rotation number, a broken line ne3 indicates a case where the idle-up control in the present embodiment is not executed when no foreign-matter lodging exist. A solid line ne4 shows the target idle rotation number TidNE when foreign-matter lodging exists.

In FIG. 10 (b), a solid line represents the accelerator opening degree ACC, a thick line ta1 shows the throttle opening degree when the idle-up control in the present embodiment is executed when the foreign-matter lodging exists and the EGR valve 18 is controlled to be slowly closed after foreign-matter removal control, a thick broken line ta2 represents the throttle opening degree in a case where the EGR valve 18 is quickly closed after foreign-matter removal control and thus feedback control is not performed in good time, and a broken line ta3 indicates the throttle opening degree in a case where idle-up control in the present embodiment is not executed when no foreign-matter lodging exists.

In FIG. 10 (d), a thick line ea1 represents a case where the EGR valve 18 has a foreign matter lodged therein, in which the EGR valve 18 is preliminarily opened (held at the first opening degree ΦXst1) and the EGR valve 18 is controlled to be slowly closed after foreign-matter removal control, i.e., represents an actual opening degree and also a controlled opening degree (a command value). A thick broken line ea2 shows a case where the EGR valve 18 is quickly closed after removal of a foreign matter. A solid line ea3 indicates a case where the idle-up control in the present embodiment is not executed when no foreign-matter lodging exists. A broken line ea4 shows a case where foreign-matter lodging exists in the EGR valve 18. A solid line ea5 indicates a case where the EGR valve 18 is out of step. A thick line ea6 represents a case where step-out is initialized.

In FIG. 10 (e), a thick line ra1 represents a case where the idle-up control in the present embodiment is executed when foreign-matter lodging exists, a thick broken line ra2 shows a case where the EGR valve 18 is quickly closed after removal of a foreign matter, a broken line ra3 indicates a case where the idle-up control in the present embodiment is not executed when no foreign-matter lodging exists, and a broken line ra4 shows a case where a foreign matter FB is not removed even when the foreign-matter removal control is executed.

In FIG. 10 (f), a broken line p1 represents a case where foreign-matter lodging exists, a thick line p2 shows a case where no foreign-matter lodging exists, and a thick broken line p3 indicates a case where the foreign matter FB is not removed even when the foreign-matter removal control is executed.

In FIG. 10 (g), a thick line pm1 represents a case where the idle-up control in the present embodiment and the foreign-matter removal control are executed when foreign-matter lodging exists, a thick broken line pm2 shows a case where the EGR valve 18 is quickly closed after removal of a foreign matter and thus feedback control is not performed in good time, a thick broken line pm3 indicates a case where the idle-up control in the present embodiment is not executed when no foreign-matter lodging exists, a thick broken line pm4 shows a case where the idle-up control in the present embodiment is not executed when foreign-matter lodging is present, a solid line pm5 indicates a case where the EGR valve 18 has stepped out, and a thick line pm6 shows a case where the step-out is initialized.

In FIG. 10, when the accelerator opening degree ACC starts to decrease (a deceleration demand enters) at t1, the throttle opening degree TA in (b) and the EGR opening degree in (d) each start to decrease at slightly later time t2. In other words, the electronic throttle device 14 and the EGR valve 18 each start to close. Then, at time t3, the throttle opening degree TA in (b) reaches a predetermined deceleration opening degree (the basic idle opening degree KidTA, but the EGR opening degree in (d) is not fully closed because of step-out. If foreign-matter lodging exists in the EGR valve 18 just before time t3, denoted by a triangular mark, the EGR opening degree remains open at a certain opening degree as shown by the broken line ea4 in (d).

Thereafter, when it is determined that foreign-matter lodging exists in the EGR valve 18 as indicated by the broken line p1 in (f) at time t4, the idle-up control in the present embodiment is executed, so that the target idle rotation number TidNE becomes the first set value SV1 as indicated by the solid line ne4 in (a). Accordingly, when the actual engine rotation number NE falls below the target idle rotation number TidNE at time t5 as indicated by the thick line ne1 in (a), the subsequent throttle opening degree TA is controlled as indicated by the thick line ta1 in (b) and the engine rotation number NE is controlled to converge to the target idle rotation number TidNE as shown by the thick line ne1 in (a). As the thick line pm1 in (g), therefore, the intake pressure PM that starts to decrease after time t3 rises by idle-up and then slowly increases by time t6, coming close to atmospheric pressure PA. Herein, it is conceived that the intake pressure PM comes close to the atmospheric pressure PA due to influence by both conditions; an increase in intake pressure PM because the lodged foreign-matter diameter KΦXOP in the EGR valve 18 is large and an increase in intake pressure due to idle-up for avoidance of engine stall (this increase is larger as the lodged foreign-matter diameter KΦXOP is larger). For this reason, the EGR rate that has increased once after time t3 decreases and becomes almost constant until time t6 as indicated by the thick line ra1 in (e). The rise in EGR rate is suppressed during deceleration of the engine 1 in the above manner, so that the engine stall of the engine 1 can be avoided.

On the other hand, when it is determined step-out exists in the EGR valve 18 at time t3, the control of the EGR valve 18 is initialized as indicated by the broken line ea4 and the solid line ea5 in (d). On the other hand, as indicated by the thick line ea1, the command value of the EGR opening degree is opened to the first opening degree ΦXst1 after time t3 and held thereat by time t6, and thereafter opened from the first opening degree ΦXst1 to the second opening degree ΦXst2 at time t7 to remove a foreign matter FB, and the foreign-matter removal flag XRM is turned to 1 as indicated in (c). Thus, the foreign matter FB is removed from the EGR valve 18. Subsequently, as indicated by the thick line ea1, the EGR valve 18 restores from the second opening degree ΦXst2 to the first opening degree ΦXst1. However, from time t8 to time t10, the EGR valve 18 is slowly closed at a slower speed than a normal valve-closing speed. At time t10, the foreign-matter removal flag XRM is returned to 0 as indicated in (c). Accordingly, the EGR rate decreases toward 0 after time t8 as indicated by the thick line ra1 in (e), and the intake pressure PM decreases from the atmospheric pressure PA toward a normal value after time t8 as indicated by the thick line pm1 in (g).

According to the engine system in the present embodiment described above, during deceleration of the engine 1, the foreign-matter lodging abnormality in the EGR valve 18 (the abnormality in opening/closing between the valve seat 32 and the valve element 33) and the lodged foreign-matter diameter KΦXOP (the level of the abnormality) therein are diagnosed based on the detected intake pressure PM (the operating state). When the existence of foreign-matter lodging abnormality and the lodged foreign-matter diameter KΦXOP are determined, and before fuel cut (shutoff of supply of fuel) to the engine 1 is performed, the EGR valve 18 is held at the first opening degree ΦXst1 smaller than the second opening degree ΦXst2 needed to remove a foreign matter FB (to resolve the abnormality). Thus, before fuel cut to the engine 1, the EGR valve 18 is held in advance at the first opening degree ΦXst1 smaller than the second opening degree ΦXst2 before the EGR valve 18 is opened to the needed second opening degree ΦXst2, so that the time to open to the second opening degree ΦXst2 is shortened. This can shorten the time needed to open the EGR valve 18 to the necessary second opening degree ΦXst2 at the timing of removing a foreign matter FB from the EGR valve 18, thereby enhancing operational performance of removing a foreign matter FB.

According to the configuration in the present embodiment, the EGR valve 18 is held at the first opening degree ΦXst1 and then, after fuel to the engine 1 is cut, the EGR valve 18 is opened to the second opening degree ΦXst2 to remove a foreign matter FB. For the purpose of removing the foreign matter FB, accordingly, the EGR valve 18 is opened from the first opening degree ΦXst1 to the second opening degree ΦXst2 under the condition that no combustion deterioration due to EGR gas occurs in the engine 1. Even if EGR gas flows in the engine 1, therefore, the foreign matter FB can be removed quickly from the EGR valve 18 while no combustion deterioration occurs.

According to the configuration in the present embodiment, after the EGR valve 18 is held at the first opening degree ΦXst1, when the intake pressure PM comes close to atmospheric pressure PA, the EGR valve 18 is opened to the second opening degree ΦXst2 to remove a foreign matter FB (to resolve the abnormality). Accordingly, at the time of removing the foreign matter FB from the EGR valve 18, the intake pressure PM is close to atmospheric pressure PA. Thus, in the situation that less EGR gas leaks from the EGR valve 18 to the intake passage 3, removal of a foreign matter FB can be performed quickly. This can prevent further combustion deterioration from being caused at the time of resolution of abnormality (removal of foreign matter) of the EGR valve 18.

According to the configuration in the present embodiment, it is determined whether or not the step motor 34 is out of step based on the detected intake pressure PM (the operating state). When the step motor 34 is determined to be out of step, the command to control the step motor 34 is initialized during deceleration of engine 1. When the foreign-matter lodging abnormality is determined to exist, the EGR valve 18 is held at the first opening degree ΦXst1 after initialization and then opened to the second opening degree ΦXst2 to remove the foreign matter FB (resolve the abnormality). To remove the foreign matter FB from the EGR valve 18, therefore, even when the step motor 34 is out of step, the command to control the step motor 34 is initialized and thereafter the EGR valve 18 is opened from the first opening degree ΦXst1 to the second opening degree ΦXst2. Even in the existence of step-out of the step motor 34, accordingly, the EGR valve 18 can be appropriately opened from the first opening degree ΦXst1 to the second opening degree ΦXst2.

According to the configuration in the present embodiment, for avoidance of engine stall, the electronic throttle device 14 (the output adjusting unit) is controlled according to the lodged foreign-matter diameter KΦXOP (the abnormality level) in the EGR valve 18 to make up for decreased output power (combustion deterioration) of the engine 1 due to the abnormality of the EGR valve 18. After the electronic throttle device 14 is controlled and the EGR valve 18 is opened from the first opening degree ΦXst1 to the second opening degree ΦXst2 to remove a foreign matter FB (to resolve the abnormality), the EGR valve 18 is slowly closed at a slower speed than a normal valve-closing speed. This slowly reduces leakage of EGR gas from the EGR valve 18. Accordingly, it is possible to suppress drastic combustion enhancement (torque rise) in the engine 1 caused when the output power of the engine 1 is increased to avoid engine stall, and thus improve drivability.

According to the configuration in the present embodiment, after the EGR valve 18 is slowly closed, it is diagnosed again whether or not the foreign-matter lodging abnormality (abnormality in opening/closing) exists in the EGR valve 18. Only when nonexistence of the abnormality is determined, the control of the electronic throttle device 14 (the output adjusting unit) to avoid engine stall is canceled. Accordingly, only when that it is ascertained again that the abnormality does not exist in the EGR valve 18, idle-up of the engine 1 to avoid engine stall is eliminated. Thus, re-diagnosis of the abnormality of the EGR valve 18 enables to avoid engine stall caused when a foreign matter FB remains (the abnormality is not resolved) and also to promptly return the control of the electronic throttle device 14 to the normal control after the foreign matter FB is removed (the abnormality is resolved).

According to the configuration in the present embodiment, during deceleration of the engine 1, the electronic throttle device 14 is subjected to feedback control to bring the detected engine rotation number NE to a predetermined target idle rotation number TidNE for idle-up of the engine 1. Herein, for a period until a predetermined time elapses from the deceleration start, the target idle rotation number TidNE is a predetermined first set value SV1 for avoidance of engine stall. For instance, even when the EGR valve 18 is not fully placed in a fully-closed state because of lodging of a foreign matter FB or the like, causing EGR gas to leak to the intake passage, idle-up is performed to the first set value SV1 for avoidance of engine stall of the engine 1, thereby enabling the avoidance of engine stall. When a predetermined time elapses from the time when the target idle rotation number TidNE reaches the first set value SV1, the target idle rotation number TidNE shifts to the second set value SV2 lower than the first set value SV1, so that the level of idle-up is reduced by one step. Accordingly, during deceleration of the engine 1, when the EGR valve 18 is not perfectly placed in a fully-closed position due to foreign-matter lodging or the like, it is possible to avoid a delay in increasing intake air by idle-up at an initial stage of deceleration. This can avoid engine stall.

According to the configuration in the present embodiment, when it is determined that abnormality exists in the EGR valve 18, the second set value SV2 for the target idle rotation number TidNE is calculated based on the level of the abnormality (the lodged foreign-matter diameter KΦXOP). Thus, when abnormality exists in the EGR valve 18 (the foreign-matter lodging abnormality) and EGR gas may leak into the intake air, the target idle rotation number TidNE becomes the first set value SV1 and then shifts to the second set value SV2 according to the diameter of a foreign matter FB. Thus, idle-up is reduced by one step to a necessary and sufficient level. Accordingly, at a later stage during deceleration of the engine 1, it is possible to avoid engine stall and simultaneously prevent the occurrence of a feeling that the engine 1 idles (an uncomfortable feeling that the engine 1 does not slow down as requested by a driver).

The present embodiment supposes the full-closing abnormality due to lodging of a foreign matter FB as the abnormality in opening/closing of the EGR valve 18. Not limited to lodging of a foreign matter FB, however, the abnormality that the valve element 33 cannot be fully closed due to sticking or other causes can also be supposed.

According to the configuration in the present embodiment, when it is determined that abnormality exists in the EGR valve 18, the foreign-matter removal control is performed to open the EGR valve 18 at the opening degree (the second opening degree ΦXst2) larger than the opening degree corresponding to the diameter of a foreign matter FB to remove the foreign matter FB lodged between the valve seat 32 and the valve element 33. Thus, the EGR valve 18 can be quickly returned from the foreign-matter lodging abnormality to a normal state. In this regard, the occurrence of misfire or engine stall of the engine 1 can be avoided.

The present disclosure is not limited to the foregoing embodiment and may be partly embodied in other specific forms without departing from the essential characteristics thereof.

(1) In the foregoing embodiment, the EGR device 10 is embodied in a so-called high-pressure-loop EGR device in a gasoline engine system equipped with no supercharger. As an alternative, the EGR device may be embodied in so-called high-pressure-loop and low-pressure-loop EGR devices in gasoline engine systems each equipped with a supercharger.

(2) In the foregoing embodiment, the electronic throttle device 14 is used as the output adjusting unit and the idle-up control carried out by this device 14 is executed as the control to avoid engine stall. As an alternative, the ignition device 29 may be used as the output adjusting unit and the ignition timing advance control carried out by this device 29 may be executed as the control to avoid engine stall. As still another alternative, the injector 25 may be used as the output adjusting unit and the fuel amount increasing control carried out by this injector 25 may be executed as the control to avoid engine stall.

(3) In the foregoing embodiment, the present disclosure is applied to the gasoline engine system but also may be applied to a diesel engine system.

INDUSTRIAL APPLICABILITY

The present disclosure is applicable to a gasoline engine system and a diesel engine system, each including an EGR device.

REFERENCE SIGNS LIST

1 Engine
3 Intake passage
5 Exhaust passage
10 EGR device (Exhaust gas recirculation device)
14 Electronic throttle device (Output adjusting unit)
17 EGR passage (Exhaust gas recirculation passage)
18 EGR valve (Exhaust gas recirculation valve)
23 Throttle sensor (Operating-state detecting unit)
25 Injector (Fuel supply unit, Output adjusting unit)
27 Accelerator sensor (Operating-state detecting unit)
29 Ignition device (Output adjusting unit)
32 Valve seat
33 Valve element
34 Step motor
50 ECU (Controller)
51 Intake pressure sensor (Operating-state detecting unit, Intake pressure detecting unit)
52 Rotation number sensor (Operating-state detecting unit)
53 Water temperature sensor (Operating-state detecting unit)
54 Airflow meter (Operating-state detecting unit)
55 Air-fuel ratio sensor (Operating-state detecting unit)
PM Intake pressure
KΦXOP Lodged foreign-matter diameter
ΦXst1 First opening degree
ΦXst2 Second opening degree

What is claimed is:

1. An engine system comprising:
an engine;
an intake passage configured to introduce intake air into the engine;
an exhaust passage configured to discharge exhaust gas from the engine;
a fuel supply unit configured to supply fuel to the engine;
an exhaust gas recirculation device including:
an exhaust gas recirculation passage configured to allow part of the exhaust gas discharged from the engine to the exhaust passage to flow as an exhaust recirculation gas into the intake passage to recirculate into the engine; and
an exhaust gas recirculation valve configured to regulate an amount of the exhaust recirculation gas in the exhaust gas recirculation passage,
the exhaust gas recirculation valve including a valve seat, a valve element provided to be capable of seating on the valve seat, and a step motor configured to drive the valve element;
an operating-state detecting unit configured to detect an operating state of the engine; and
a controller configured to control at least the fuel supply unit and the step motor of the exhaust gas recirculation valve based on the detected operating state of the engine,
wherein the controller is configured to diagnose abnormality in opening/closing between the valve seat and the valve element in the exhaust gas recirculation valve and a level of the abnormality based on the detected operating state during deceleration of the engine, and
when existence of the abnormality and the abnormality level are determined, and before supply of the fuel to the engine by the fuel supply unit is shut off, the controller is configured to control the step motor to hold the exhaust gas recirculation valve at a first opening degree smaller by a predetermined value than a second opening degree needed to resolve the determined abnormality and larger than a minimum controlled opening degree that occurs after deceleration start of the engine but before the existence of the abnormality is determined.

2. The engine system according to claim 1, wherein after the exhaust gas recirculation valve is held at the first opening degree and supply of the fuel to the engine by the fuel supply unit is shut off, the controller is configured to control the step motor to open the exhaust gas recirculation valve to the second opening degree to resolve the abnormality.

3. The engine system according to claim 1, wherein
the operating-state detecting unit includes an intake pressure detecting unit configured to detect intake pressure of the engine, and
after the exhaust gas recirculation valve is held at the first opening degree, when the detected intake pressure comes close to atmospheric pressure, the controller is configured to control the step motor to open the exhaust gas recirculation valve to the second opening degree to resolve the abnormality.

4. The engine system according to claim 1, wherein
the controller is configured to diagnose whether or not the step motor is out of step based on the detected operating state,
when it is determined that the step motor is out of step, the controller is configured to initialize a command to control the step motor during deceleration of the engine,
when the existence of the abnormality is determined, the controller is configured to control the step motor to hold the exhaust gas recirculation valve at the first opening degree and then open the exhaust gas recirculation valve to the second opening degree to resolve the abnormality after initialization.

5. The engine system according to claim 2, further including an output adjusting unit configured to adjust output of the engine,
wherein the controller is configured to control the output adjusting unit according to the determined abnormality level to avoid engine stall, and
after control of the output adjusting unit, and after the exhaust gas recirculation valve is held at the first opening degree and then opened to the second opening degree to resolve the abnormality, the controller is configured to control the step motor to slowly close the exhaust gas recirculation valve at a slower speed than a normal valve-closing speed.

6. The engine system according to claim 5, wherein
after controlling the step motor to slowly close the exhaust gas recirculation valve, the controller is configured to diagnose again existence or nonexistence of the abnormality in opening/closing of the exhaust gas recirculation valve, and
only when the nonexistence of the abnormality is determined, the controller is configured to cancel the control of the output adjusting unit to avoid engine stall.

* * * * *